(12) United States Patent
Kim et al.

(10) Patent No.: US 12,362,649 B2
(45) Date of Patent: Jul. 15, 2025

(54) PHASE SHIFTED FULL-BRIDGE CONVERTER

(71) Applicant: LG INNOTEK CO., LTD., Seoul (KR)

(72) Inventors: Soo San Kim, Seoul (KR); Jae Yeop Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 124 days.

(21) Appl. No.: 18/035,348

(22) PCT Filed: Nov. 5, 2021

(86) PCT No.: PCT/KR2021/016031
§ 371 (c)(1),
(2) Date: May 4, 2023

(87) PCT Pub. No.: WO2022/098148
PCT Pub. Date: May 12, 2022

(65) Prior Publication Data
US 2023/0421043 A1    Dec. 28, 2023

(30) Foreign Application Priority Data

Nov. 5, 2020   (KR) .......................... 10-2020-0146543

(51) Int. Cl.
*H02M 3/335*    (2006.01)
*H02M 1/00*    (2006.01)
*H02M 1/42*    (2007.01)

(52) U.S. Cl.
CPC ....... *H02M 1/0096* (2021.05); *H02M 1/0043* (2021.05); *H02M 1/4208* (2013.01); *H02M 3/33573* (2021.05)

(58) Field of Classification Search
CPC ............ H02M 1/4208; H02M 1/0043; H02M 1/0096; H02M 3/33573
See application file for complete search history.

(56) References Cited

U.S. PATENT DOCUMENTS

| | | | |
|---|---|---|---|
| 7,888,919 B2 * | 2/2011 | Dishman | H02M 3/156 323/284 |
| 9,774,263 B1 * | 9/2017 | Chen | H02M 7/217 |
| 10,554,140 B1 | 2/2020 | Khamesra et al. | |
| 2005/0185430 A1 * | 8/2005 | Vinciarelli | H02M 3/157 363/65 |
| 2005/0254272 A1 * | 11/2005 | Vinciarelli | H02M 3/33573 363/65 |

(Continued)

FOREIGN PATENT DOCUMENTS

| | | | | |
|---|---|---|---|---|
| CN | 115528918 A | * | 12/2022 | .............. H02M 3/01 |
| GB | 2528894 A | * | 2/2016 | .............. H02M 1/38 |

(Continued)

*Primary Examiner* — Sisay G Tiku
(74) *Attorney, Agent, or Firm* — Birch, Stewart, Kolasch & Birch, LLP

(57) ABSTRACT

A converter according to an embodiment of the present invention comprises: a voltage transformer unit which converts the input voltage of input power to a predetermined voltage and outputs same, and a control unit which controls the operating frequency of the voltage transformer unit according to states of the input power.

20 Claims, 10 Drawing Sheets

(56) References Cited

U.S. PATENT DOCUMENTS

| | | | |
|---|---|---|---|
| 2005/0270812 A1* | 12/2005 | Vinciarelli | H02M 3/33573 |
| | | | 363/65 |
| 2009/0167089 A1* | 7/2009 | Dishman | H02J 1/10 |
| | | | 307/64 |
| 2012/0033457 A1* | 2/2012 | Kim | H02M 3/33553 |
| | | | 363/21.04 |
| 2016/0036340 A1 | 2/2016 | Kikuchi et al. | |

FOREIGN PATENT DOCUMENTS

| | | | |
|---|---|---|---|
| JP | 2016-36242 A | 3/2016 | |
| KR | 20100016733 A * | 2/2010 | |
| KR | 10-2012-0013533 A | 2/2012 | |
| KR | 10-2016-0054319 A | 5/2016 | |
| WO | WO 2005/015718 A2 | 2/2005 | |
| WO | WO-2013155272 A1 * | 10/2013 | H02M 3/33507 |

\* cited by examiner

[FIG. 1]
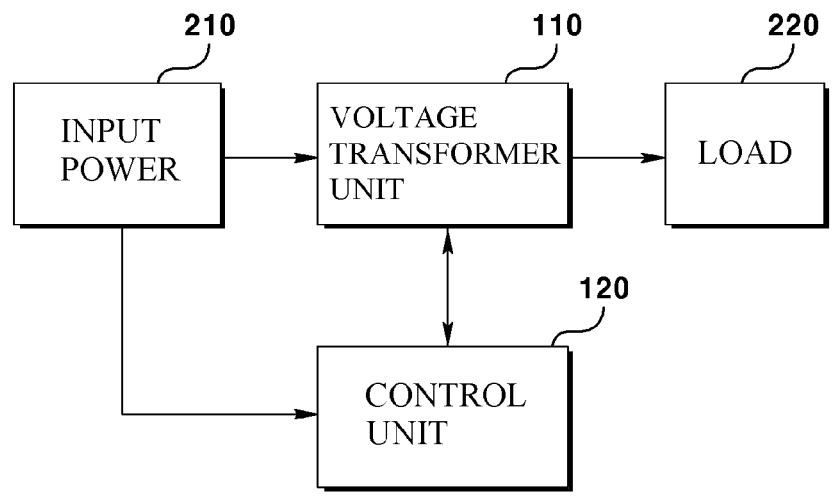

[FIG. 2]
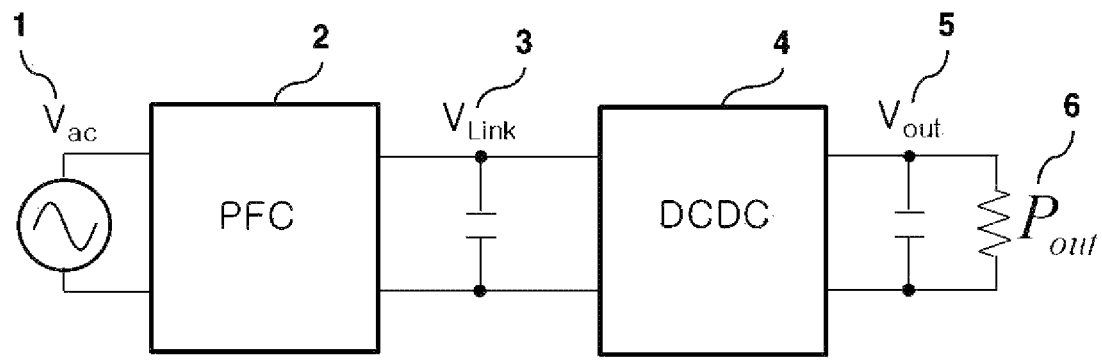
[FIG. 3]
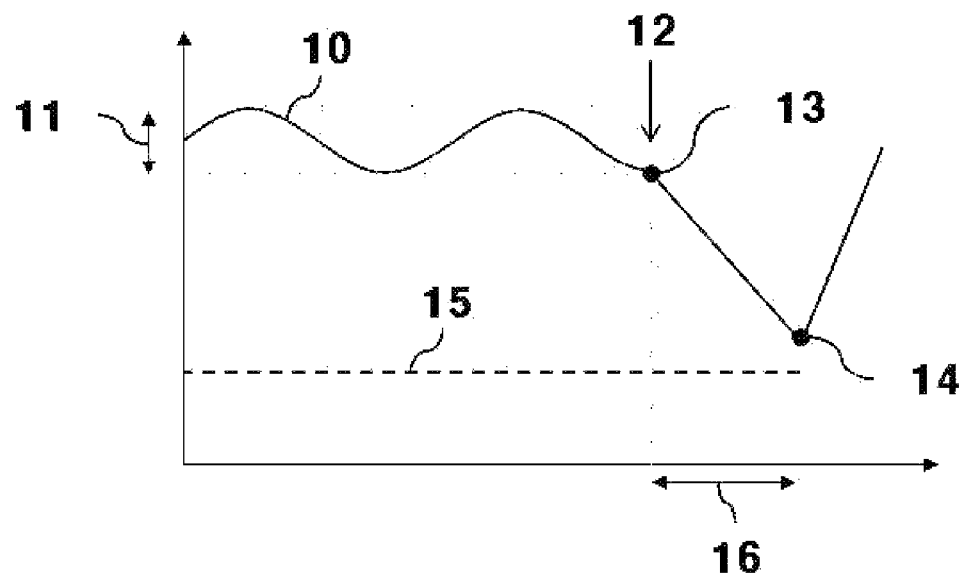

[FIG. 4]
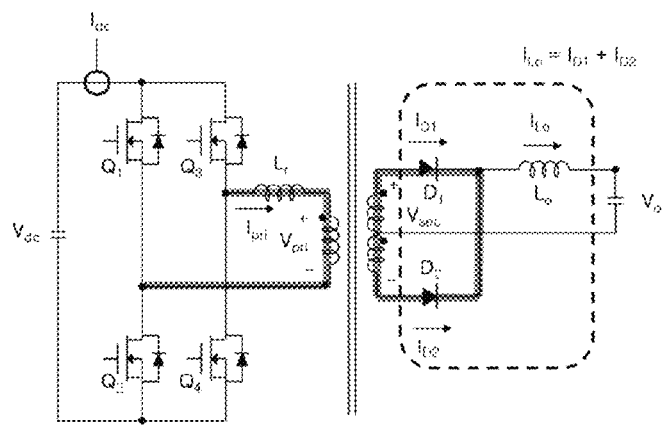
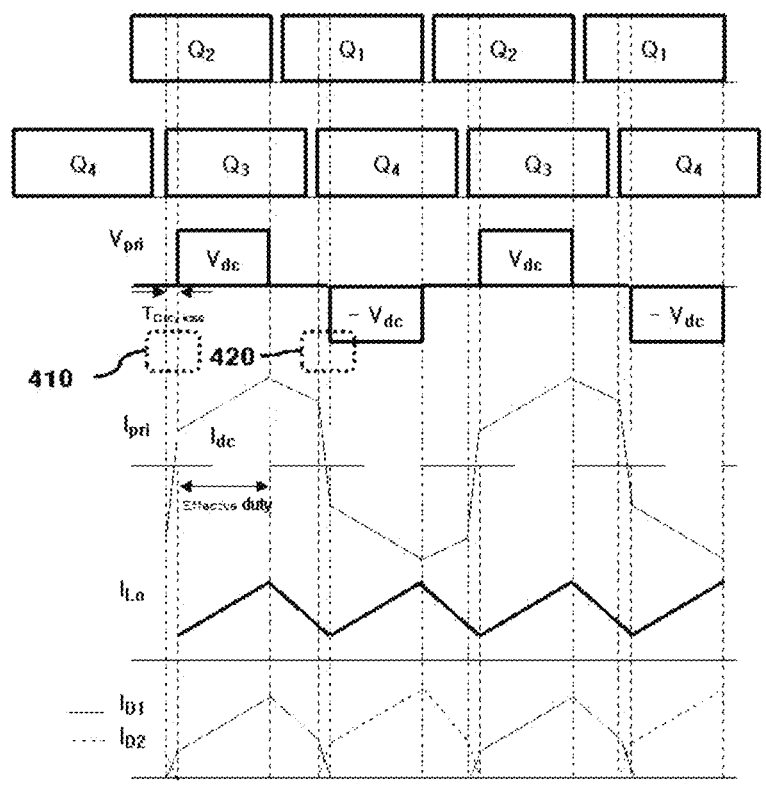

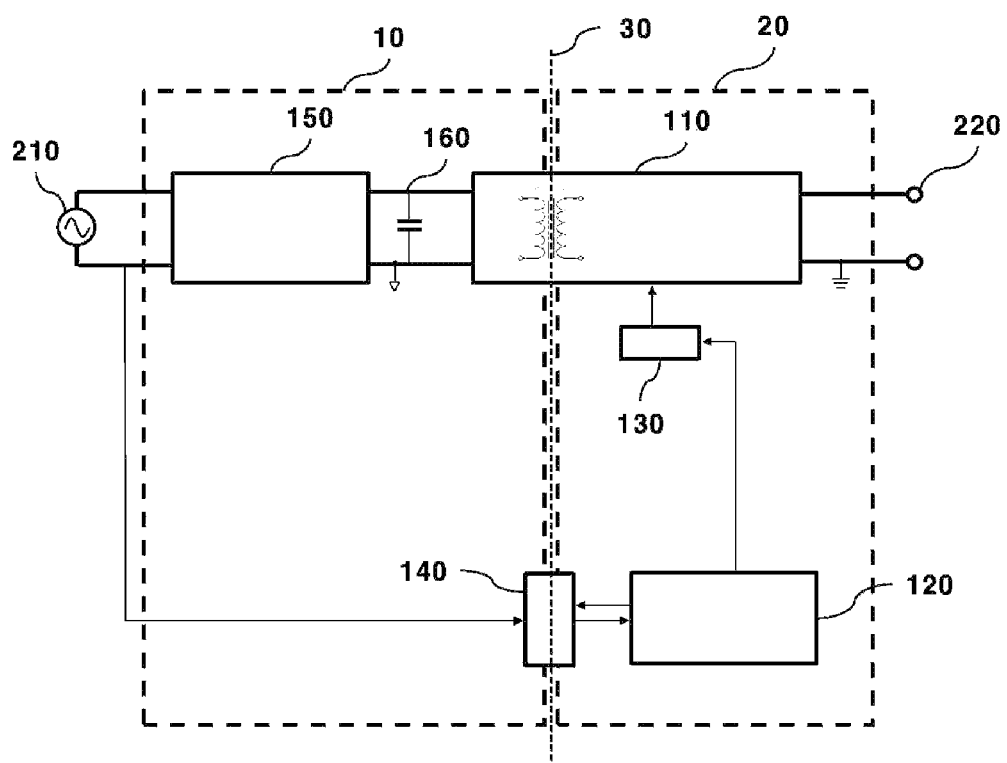
[FIG. 5]

[FIG. 6]
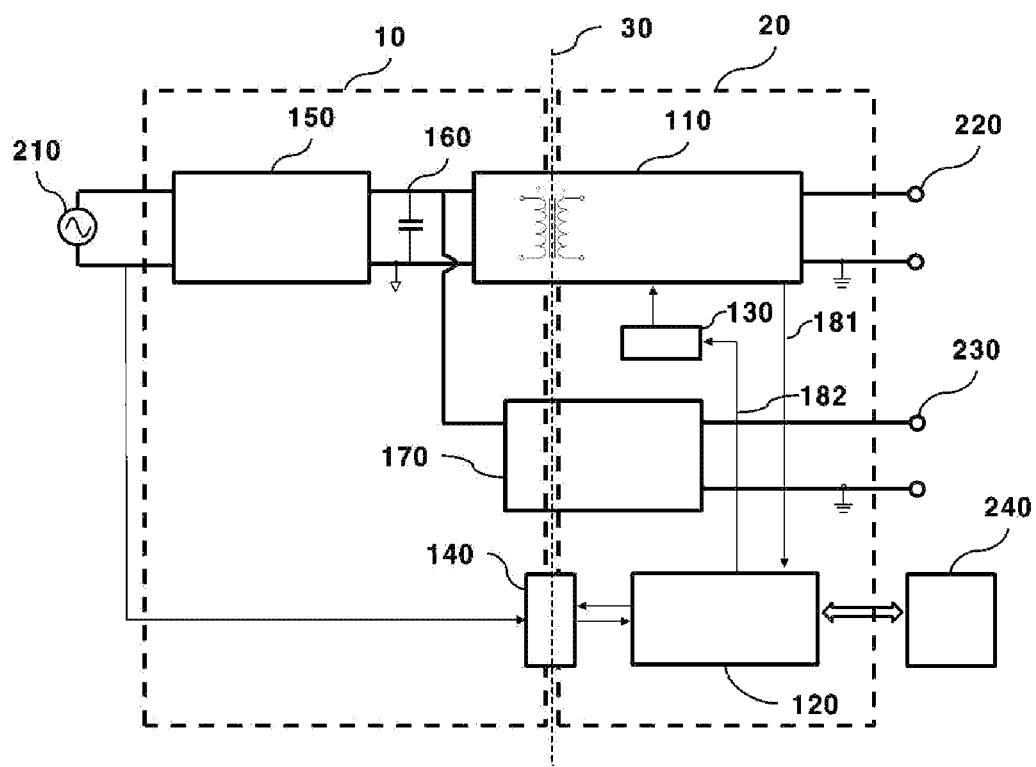

[FIG. 7]
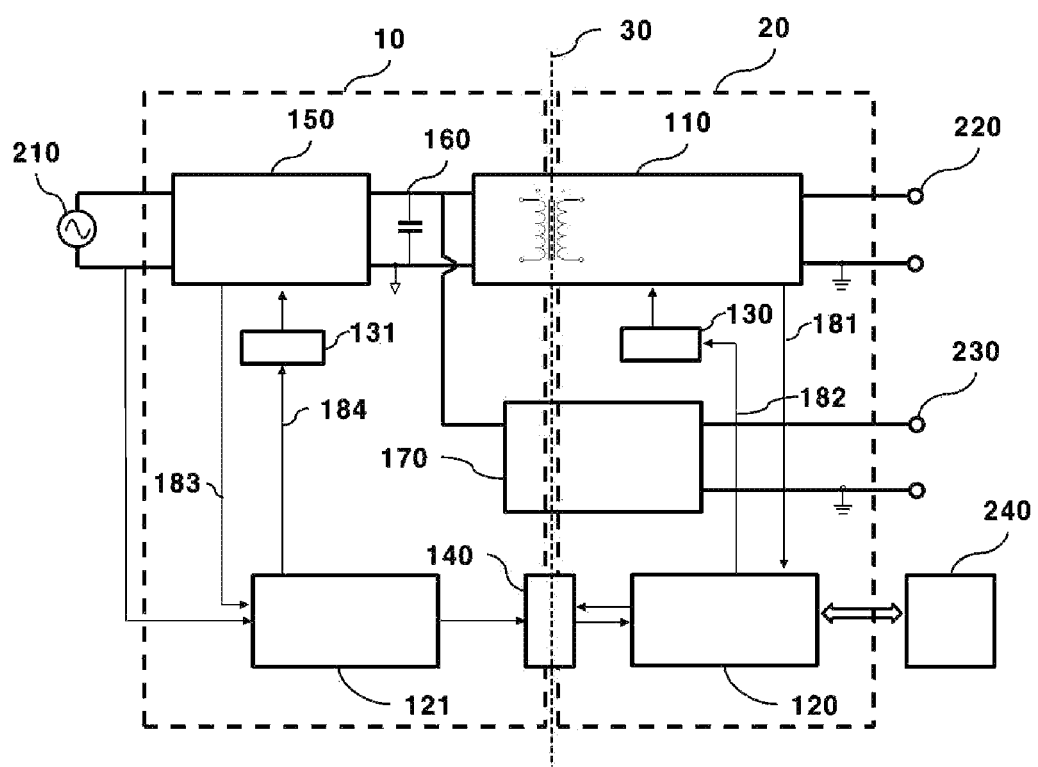

[FIG. 8]
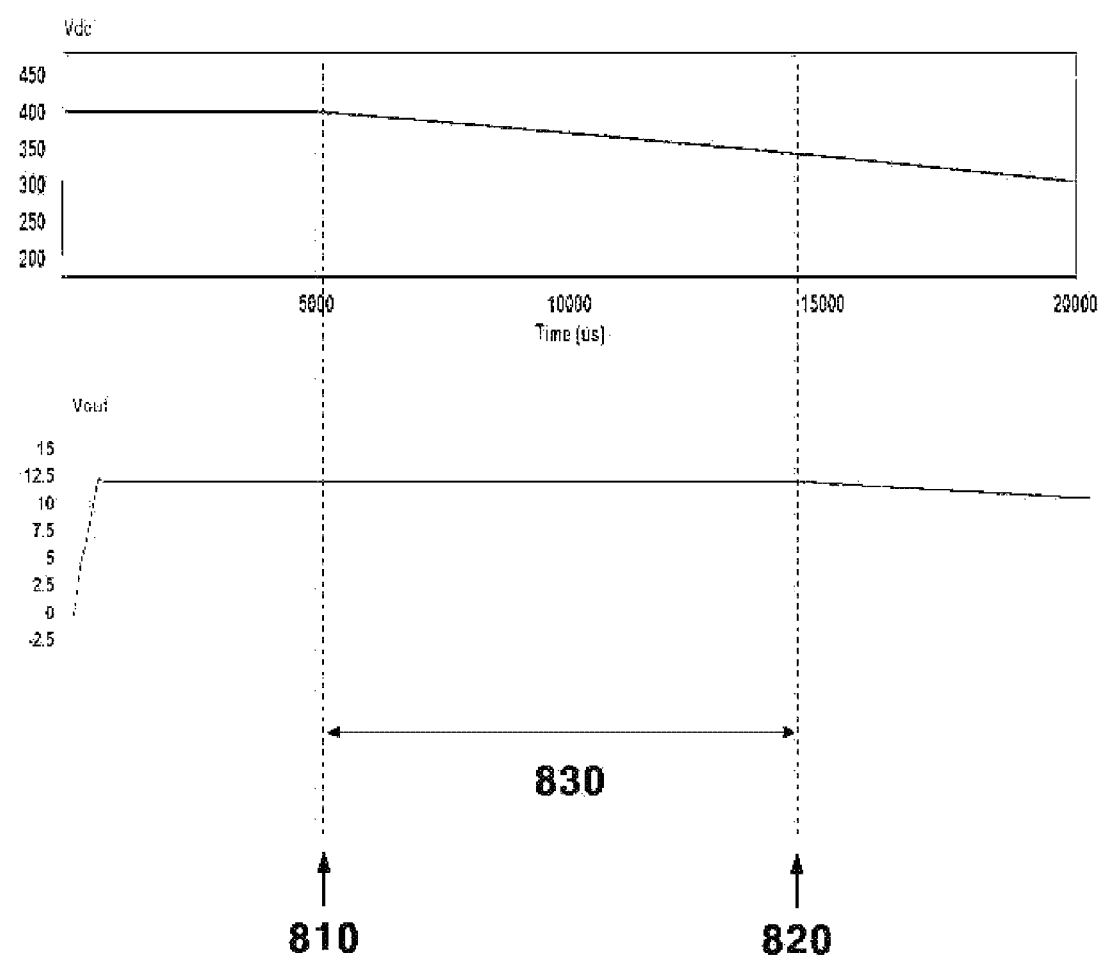

[FIG. 9]
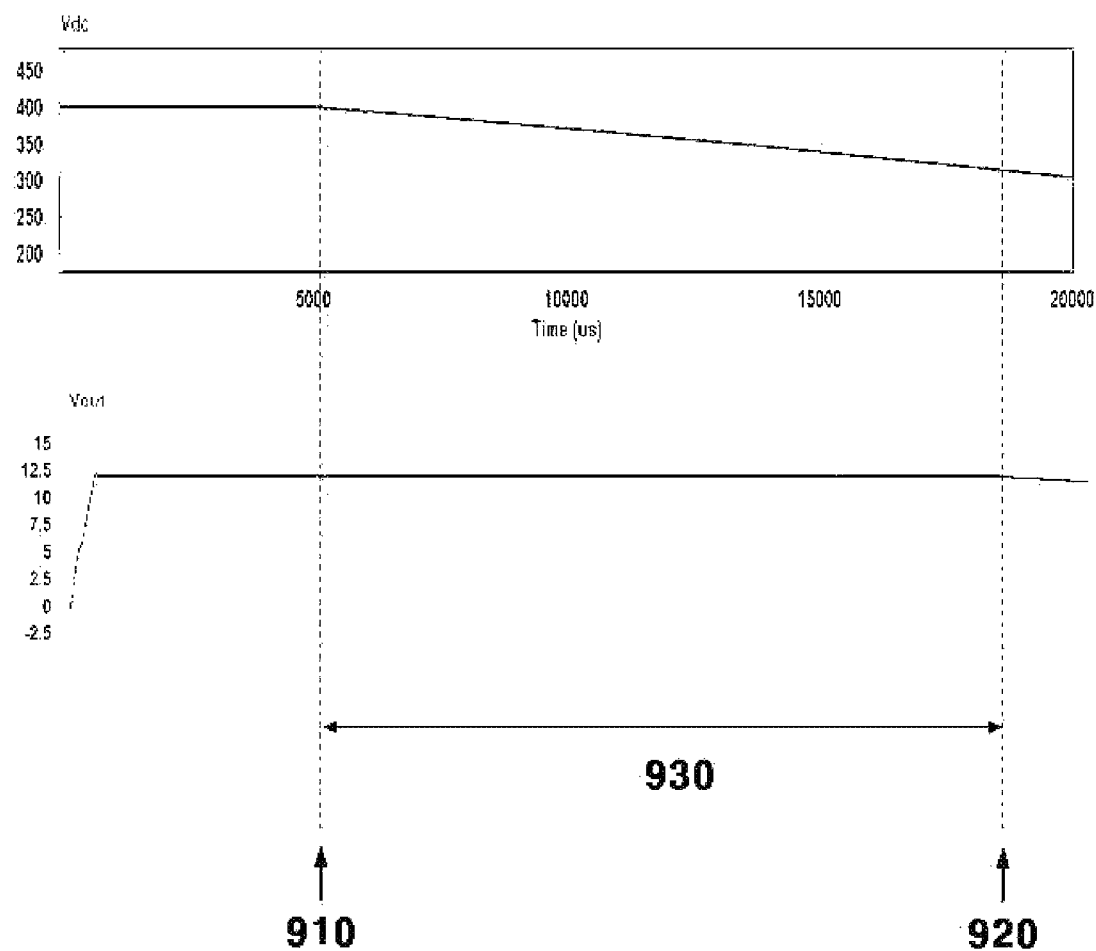

[FIG. 10]
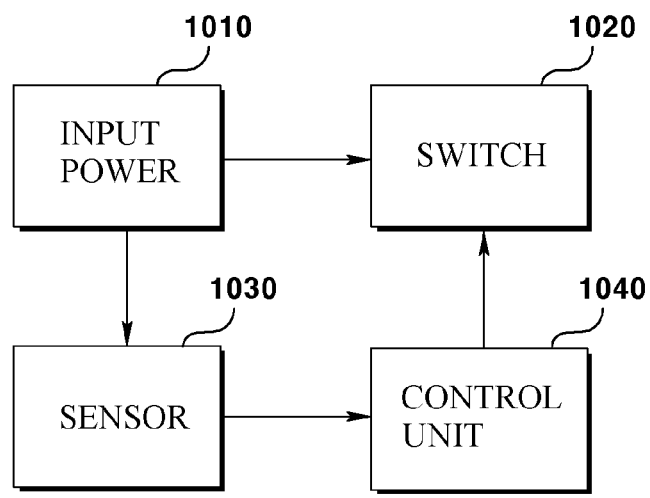

[FIG. 11]
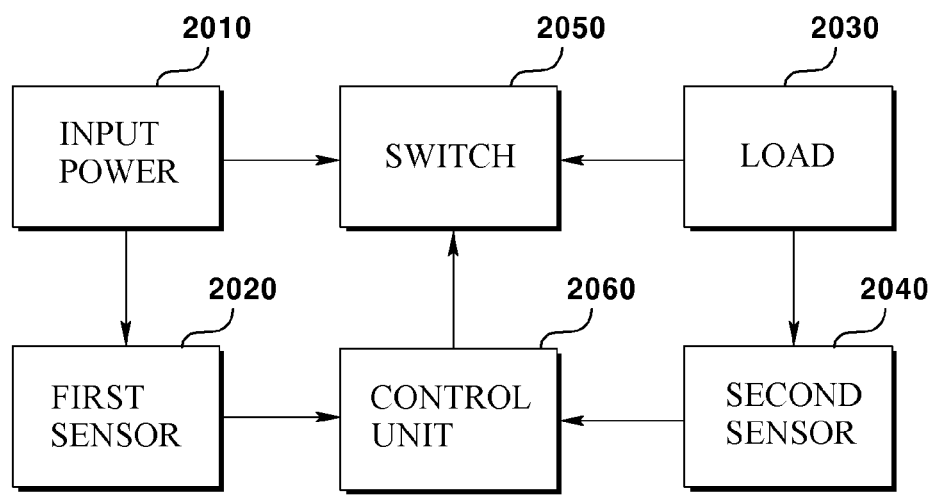

PHASE SHIFTED FULL-BRIDGE CONVERTER

CROSS REFERENCE TO RELATED APPLICATIONS

This application is the National Phase of PCT International Application No. PCT/KR2021/016031, filed on Nov. 5, 2021, which claims priority under 35 U.S.C. 119 (a) to Patent Application No. 10-2020-0146543, filed in the Republic of Korea on Nov. 5, 2020, all of which are hereby expressly incorporated by reference into the present application.

TECHNICAL FIELD

The teachings in accordance with exemplary and non-limiting embodiments of this invention relate generally to a converter, and more particularly, to a converter improved in hold-up time.

BACKGROUND OF THE INVENTION

A full-bridge converter is a converter that transmits voltages through a transformer by complementary switching of four switching elements. The phase shifted full-bridge converter is a full-bridge converter that operates in a phase shifted control method, and controls the phase of a switch so that the switching time overlaps to increase the magnitude of a current flowing to the secondary side. Accordingly, zero voltage switching is possible.

When an input power is suddenly cut off during the converter operation, an operation should not stop immediately, and the operation should be maintained for a hold-up time of specific time to stably stop the operation, or maintained to perform a specific operation such as an operation using an auxiliary power source. For a stable operation, a technology capable of extending the said hold-up time is required.

DISCLOSURE

Technical Field

The technical subject to be solved by the present invention is to provide a converter improved in hold-up time.

Technical Solution

In order to solve the aforementioned subject, a converter according to an exemplary embodiment of the invention may comprise: a voltage transformer unit which converts an input voltage of input power to a predetermined voltage and outputs same; and a control unit which controls an operating frequency of the voltage transformer unit as a first frequency when state of the input power is a first state, and controls the operating frequency of the voltage transformer unit as a second operating frequency when the state of the input power is a second state.

Preferably, the first state may be a normal state, and the second state may be a state where an abnormality has developed on the input power.

Preferably, the first frequency may be greater than the second frequency. Preferably, the second frequency may be so set up as to allow an output voltage of the voltage transformer unit to maintain a first value for a first time duration.

Preferably, the second state may include a case where the voltage of the input power is less than a predetermined value or an input of the input power is cut off.

Preferably, the second frequency may be changed in response to the magnitude of voltage at a link end of primary side of the voltage transformer unit.

Preferably, the second frequency may be changed in response to the magnitude of voltage of the input power.

Preferably, the control unit may PWM (Pulse Width Modulation) control a switch included in the voltage transformer unit in response to the second frequency.

Preferably, the control unit may control an operating frequency at a secondary side of the voltage transformer unit.

Preferably, the control unit may be disposed at a secondary side of the converter.

Preferably, the converter may include an isolator which insulates a primary side and a secondary side of the converter, and the control unit may receive a state of the input power through the isolator.

Preferably, the converter may include a primary sided control unit disposed at a primary side of the converter to detect a state of the input power, and the control unit may be a secondary side control unit which receives a state of the input power from the primary side control unit.

Preferably, the voltage transformer unit may include a plurality of switches which forms a full bridge and performs a phase shift operation; and a transformer which changes voltages in response to the operations of the plurality of switches and is insulated at a primary side and a secondary side.

In order to solve the aforementioned subject, a converter according to another exemplary embodiment of the present invention may comprise: a sensor which senses a state of an input power; and a control unit which controls switches of full bridge converter, wherein the control unit controls the switches as a first frequency when the state of input power is normal, and controls the switches using a second frequency when the state of input power is abnormal.

In order to solve the aforementioned subject, a converter according to still another exemplary embodiment of the present invention may comprise: a first sensor which senses a state of an input power; a second sensor which senses a state of load; and a control unit which controls switches of a full bridge converter, wherein the control unit may control the switches using a first frequency when the state of the input power is a first state, control the switches using a second frequency when the state of input power is a second state and the state of load is a third state, and control the switches using a third frequency when the state of the input power is second state and the state of load is a fourth state.

Preferably, the first state may include a normal state, the second state may include a state where the input power is generated with abnormality, the third state may include a light load state, and the fourth state may include a load state having a value greater than that of the light load state.

Preferably, the first frequency may be greater than the second frequency, and the second frequency may be greater than the third frequency.

Advantageous Effects of the Invention

According to the exemplary embodiments of the present invention, a hold-up time can be improved. Furthermore, the hold-up time can be improved without an additional circuit because of allowing a converter to use an MCU (Micro Control Unit), whereby use of limited space and high efficiency may be accomplished.

BRIEF DESCRIPTION OF DRAWINGS

FIG. 1 is a block diagram of a converter according to an exemplary embodiment of the present invention.

FIGS. 2 and 3 are schematic views to explain a hold-up time.

FIG. 4 is an embodied example of a converter according to an exemplary embodiment of the present invention.

FIGS. 5 and 6 are other embodied examples of a converter according to an exemplary embodiment of the present invention.

FIGS. 7 to 9 are schematic views to explain an improved hold-up time of a converter according to an exemplary embodiment of the present invention.

FIG. 10 is a block diagram of a converter according to another exemplary embodiment of the present invention.

FIG. 11 is a block diagram of a converter according to still another exemplary embodiment of the present invention.

BEST MODE

Hereinafter, exemplary embodiments of the present invention will be described in detail with reference to the accompanying drawings.

However, it should be noted that the technical ideas of the present invention should not be construed as limited to some of the explained exemplary embodiments but may be embodied in mutually different various shapes, and one or more elements may be selectively coupled or substituted among exemplary embodiments as long as within the scope of technical concept of the present invention.

Furthermore, unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and/or the present application.

Furthermore, the terms used in the following exemplary embodiments are not intended to limit the invention but to explain the exemplary embodiments.

As used herein, the singular forms intended to include the plural forms as well, unless the context clearly indicates otherwise, and when it is described as at least one of "A and (or) B, C (or one or more), it means that one or more combinations of all combinations made of A, B and C may be included.

Furthermore, it will be understood that, although the terms first, second, A, B, (a), (b), etc. may be used herein to describe various elements, these elements should not be limited by these terms. These terms are only used to distinguish one element from another element, and the essence, sequence or order of relevant elements is not limited by the terms.

Furthermore, it will be understood that when an element is referred to as being "connected", "coupled" or "joined" to another element, it can be, directly or through intervening elements, "connected", "coupled" or "joined" to the other elements as well.

Furthermore, it will be understood that when an element is referred to as being "upper (above)" or "below (beneath)", the "upper (above)" or "below (beneath)" includes not only two or more elements being directly "connected", "coupled" or "joined" to the other elements but also one or more elements being formed or disposed between two or more elements.

Furthermore, when spatially relative terms, such as "beneath" ("below"), "above" ("upper") and the like are given, it may include the meaning of not only the "above" ("upper") directions but also the meaning of "beneath" ("below").

FIG. 1 is a block diagram of a converter according to an exemplary embodiment of the present invention.

A converter according to an exemplary embodiment of the present invention may be formed by including a voltage transformer unit (110) and a control unit (120).

The voltage transformer unit (110) may convert an input voltage of input power (210) to a predetermined voltage and output the same.

To be more specific, the voltage transformer unit (110) may convert the voltage inputted from the input power (210) from a first level to a second level and output the same. The first level may be greater or smaller than the second level. The voltage transformer unit (110) may output a voltage as a load (220). The voltage transformer unit (110) may be a DC-DC converter, an AC-DC converter or a DC-AC converter. The voltage transformer unit (110) may be a one-way converter, or a two-way converter. The voltage transformer unit (110) may include other various converters in addition to the given voltage transformer unit.

The control unit (120) may control an operating frequency of the voltage transformer unit (110) in response to states of input power (210).

To be more specific, the control unit (120) may detect a state of input power (210), and may control an operating frequency of the voltage transformer unit (110) in response to the state of the input power (210). When the state of the input (210) is a first state, the control unit (120) may control the operating frequency of the voltage transformer unit (110) as a second frequency, and when the state of input power (210) is a second state, the control unit (120) may control the operating frequency of the voltage transformer unit (110) as a second operating frequency. Here, the first state may be a normal state and the second state may be a state where the input power has developed an abnormal state. The control unit (120) may further include a third state in addition to the first and second states that control the operating frequency differently. The control unit (120) may control the operating frequency of the voltage transformer unit (110) as a first frequency when the input power (210) is in a normal state, and may control the operating frequency of the voltage transformer unit (110) as a second frequency when there is developed an abnormal state on the input power (210). When the input power (210) operates normally, the control unit (120) may control the voltage transformer unit (110) so that a load (220) of the input power (210) should have a voltage adequate for the load (220). At this time, the first frequency may be changed in response to a current or voltage of input voltage (210), and a current or voltage of load. That is, when in normal state, the control unit (120) may control the operation of the voltage of the voltage transformer unit (110) as the first frequency which is an operating frequency controlling the voltage transformer unit (110). Alternatively, the first frequency may be a preset frequency. The control unit (120) may control in such a manner that the converter can be operated in a Continuous Conduction Mode (CCM). Here, the Continuous Conduction Mode (CCM) may be a current continuous controlling mode in which a current in a converter can continuously flow. The control unit (120) may control in such a manner that the converter can be operated in other modes such as Discontinuous Conduction Mode (DCM) andr the like in addition to the Continuous Conduction Mode (CCM).

The control unit (120) may control the operating frequency of the voltage transformer unit (110) as a second operating frequency when the state of input power (210) is in a second state. When the input power (210) comes to a second state of abnormality in a first state where the voltage transformer unit (110) normally operates, the control unit (120) may change the operating frequency of the voltage transformer unit (110) from a first frequency to a second frequency. Here, the second state where the input power (210) develops an abnormality may include a case where the voltage of input power is less than a predetermined value, or the input of the input power (210) is cut off. At this time, a power must be received from the input power (210) and converted to output a voltage necessary for the load, where, when there is generated an abnormality on the input power (210) such as the voltage of the input power (210) dropping below a predetermined threshold value, or the input of the input power (210) being cut off, it would be difficult to output a voltage necessary for the load.

The threshold value of voltage determined as there being generated an abnormality on the input power (210) may be a minimum voltage value capable of making a magnitude of voltage necessary for the load through a general control relative to the voltage transformer unit (110). When the input itself of the input power (210) is cut off as in a case where the voltage of input power (210) drops below the threshold value, or a power line is short-circuited, it would be difficult to output a voltage necessary for the load.

When the operation of the voltage transformer unit (110) is stopped right after generation of abnormality on the input power (210), problems such as failure may occur due to abnormal operation stop. Furthermore, an output to the load may be cut off to stop the operation of devices connected to the load (220). At this time, where devices connected to the load (220), as essential devices, are devices for safety or security that must be operated even in an emergency, and when operations of relevant devices are supposed to be stopped immediately, there may be generated serious problems. An emergency power may be connected for emergency operations using auxiliary powers relative to the essential devices, an output of voltage necessary for the load (220) must be maintained before a relevant device performs a normal operation using an emergency power, which is called a hold-up time.

A particular operation must be performed such as stable stop or connection to emergency power by maintaining an operation during the hold-up time. For example, in case of PSU (Power Supply Unit), the input power may detect a sudden cut-off of AC power, and a server may perform a back-up function during the hold-up time. The hold-up time may be changed depending on applicable devices or user needs. For example, the hold-up time may be a time more than 10 msec.

As shown in FIG. 2, a circuit may be formed via an input power (1), a power factor improvement unit (2), a link end (or terminal) (3), a DC-DC converter (4), an output end (5) and a load (6) in transmitting to a load by converting the input power. The input power (1) may be an AC power. The power factor improvement unit (2) may be various types of circuits including a booster converter formed by a PFC (Power Factor Correction) circuit, an inductor, a switch and a diode. The link end (3) is a node connected by a link capacitor (3) disposed between the power factor improvement unit (2) and the DC-DC converter (4), where a voltage of relevant node is called a link voltage ($V_{Link}$). The voltage inputted from the input power (1) may be improved in the power factor through the power factor improvement unit (2), and may be applied to the DC-DC converter (4) through the link end (3). The DC-DC converter (4) may convert the applied voltage from a first level to a second level, which is then transmitted to the load (6) via an output end (5).

The voltage $V_{Link}$ (10) of link end (3) where the voltage of input power (1) passed the power factor improvement unit (2) may have a ripple voltage (11) based on a waveform of the input power under a normal state as shown in FIG. 3 and may be applied to DC-DC converter (4) having a ripple voltage (11). It is converted by the DC-DC converter (4) whereby an output voltage $V_{Link}$ out (5) is outputted to an output end. When an abnormality (voltage drop) occurs on the input power (1) at a particular point (12) while operating at a normal state, the voltage $V_{Link}$ (10) at the link end may start to drop. At this time, when it is assumed that the magnitude of voltage is $V_{initial}$ (13), the voltage at the output end (5) must maintain a voltage (15) that is to be transmitted to the load, even if the magnitude of voltage at the link end drops to $V_{min}$ (14) during the hold-up time (16).

In order to maintain a hold-up time, a transformation ratio of voltage transformer unit (110) may be variably controlled, or the voltage at the primary side of the voltage transformer unit (110) may be made to be great, the voltage at the link end may be changed based on the magnitude of load, or the leakage inductor of the voltage transformer unit (110) may be changed.

The control unit (120) according to an exemplary embodiment of the present invention may allow the voltage transformer unit (110) to maximally output a voltage necessary for the load (220) by changing an operating frequency of the transformer unit (110) to a second frequency. Here, the second frequency may be a frequency so set as to allow an output voltage of the transformer unit (110) to maintain a first value for a first hour period. Even if an abnormality is generated on the input power (210), the output voltage of the transformer unit (110) must maintain the first value for the first time period, and may change the operating frequency of the transformer unit (110) as a second frequency set to maintain the same.

The voltage transformer unit (110) may be a PSFB (Phase Shift Full B ridge) converter. The voltage transformer unit (110) may include a plurality of switches constituting a full bridge and performing the phase shift operation, and a transformer which converts a voltage in response to operation of the plurality of switches where a primary side and a secondary side are insulated. The voltage transformer unit (110) may include a complementarily conductive first upper switch for constituting a full bridge, a second upper switch complementarily conductive with a first lower switch, and a second lower switch. Here, the first upper switch and the first lower switch, and the second upper switch and the second lower switch may respectively form a half bridge, and two half bridge circuits may form a full bridge.

When there is no phase shift operation, the first upper switch and the second lower switch may all be turned off, and the second upper switch and the first lower switch may all be turned off, but through a phase shift control, a section may be made where the first upper switch and the second upper switch are all turned on, or the first lower switch and the second lower switch are all turned on to allow a current at the primary side to be more carried over to the secondary side.

When the plurality of switches included in the voltage transformer unit (110) is phase-shifted, a duty loss may be generated. Here, the duty loss may be a duty ratio loss or a switching loss. The duty of switch included in the voltage transformer unit (110) may be generated through a digital control using the control unit (120). At this time, the control unit (120) may control the switch of the voltage transformer unit (110) using a peak current mode.

As illustrated in FIG. 4, the voltage transformer unit (110) may include a first upper switch (Q1), a first lower switch (Q2), a second upper switch (Q3), and a plurality of switches of the second lower switch (Q4). The duty loss may be generated at a section (410) where Q4 is turned off and Q3 is turned off while Q2 and Q4 are in a turned on state, or at a section (420) where Q3 is turned off and Q4 is turned on while Q1 and Q3 are in a turned on state. A current induced to the secondary side of transformer at a relevant section may be changed from $I_{D1}$ to $I_{D2}$, from $I_{D2}$ to $I_{D1}$, and when two diodes (D1, D2) are all electrically conductive at the said section, the voltage across the secondary side of the transformer becomes 0 V to allow the same to be reflected on Vpri, where a voltage that must show $V_{dc}$ becomes 0 V. That is, the moment Q2 and Q3 are simultaneously turned on, 0 V instead of $V_{dc}$ is applied on the voltage $V_{pri}$ of the primary side of transformer, a duty loss section may be formed up to a time $V_{dc}$ is applied to $V_{pri}$. That is, the duty loss means a duty cycle where 0 V is applied during a particular time (duty loss), because $V_{dc}$ or $-V_{dc}$ voltage must be applied to across the voltage of transformer at a section where Q1 and Q4 or Q2 and Q3 are overlapped.

For example, a duty loss may be generated while Q1 and Q4 are turned on to allow a current to change from $I_{D1}$ to $I_{D2}$, under a situation where Q2 and Q3 are turned on to allow a current to flow to $I_{D1}$ through $I_{pri}$ whereby energy is turned over to the secondary side, and at this time, a slope of changed current may be determined by a leakage inductor $L_r$ of primary side. Therefore, as the value of the leakage inductor $L_r$ grows greater, the slope becomes smaller to increase a time when the current is changed, whereby the time of duty loss may be lengthened. The duty loss may be indicated by $T_{duty\ loss}$/switching period.

With the generation of duty loss, the effective duty in which the transformer is effectively operated may be decreased. The effective duty must be made to be increased to maximally transmit the primary side voltage to the secondary side. The effective duty may be calculated from the following Mathematical Formula 1 using a leakage inductor connected to the primary side of transformer, an input voltage, switching periods of a plurality of switches, and a current flowing in the load. That is, a duty in which a duty loss is subtracted from an entire duty may be an effective duty ($D_{eff}$).

$$D_{eff} = \frac{V_o}{nV_I} = D - \frac{4nL_rI_L}{V_IT_S} \quad \text{[Mathematical Formula 1]}$$
$$Duttyloss = \frac{4nL_rI_L}{V_IT_S}$$

Where, D eff is an effective duty, Vo is an output voltage, n is a winding ratio, D is a duty, $L_r$ is an inductance of leakage inductor at a primary side of the transformer, VI is an input voltage, $T_s$ is a switching period, and $I_L$ is a current at a load side.

When duty loss is generated, there is no way of obtaining a sufficient effective duty that a voltage of transformer is changed from a primary side to a secondary side. When the input power (210) develops an abnormality to disable to obtain a sufficient effective duty for a hold-up time where a maximum efficient operation is to be performed to turn over a voltage necessary for secondary side while a voltage at a primary side is in a low state, it would cause a great effect. When a voltage of input power is drops, a duty loss is generated to lower the efficiency of transformer, and an input voltage necessary for output an output voltage necessary for load may be increased over a case where the efficiency is high.

For example, when an abnormality is generated on the input power to cause an input voltage to drop at a predetermined speed from 30V to 10V for input voltage, and when a voltage necessary for load is 10V during the hold-up time, and a winding ratio of transformer is 2:1, a 10V, which is a voltage necessary for load, can be outputted before the input voltage comes down to 20V if there is no duty loss. That is, a hold-up time can be maintained during a time when 30 V is dropped to 20 V.

However, when there is a duty loess, and when the input voltage is 20 V, a voltage lower than 10V which is a voltage necessary for load may be outputted, and when the input voltage is reduced, a 10V, which is a voltage necessary for the load, can be outputted only for 22 V to 21V depending on the duty loss. That is, the hold-up time can be maintained only for a time when voltage is dropped from 30 V to 21 V.

Therefore, when the duty loss is generated, the hold-up time during which a voltage necessary for load can be outputted can be reduced. Conversely, when duty loss is reduced during the hold-up time to obtain a sufficient effective duty, an efficient operation is enabled, and the hold-up time can be extended because an efficient operation is enabled to output a voltage necessary for a load with a much lower input voltage thereby allowing outputting a voltage necessary for the load for a longer period of time.

In order to reduce the duty loss and increase the efficient duty for extending a hold-up time, the control unit (120) may change an operating frequency of transformer from a first frequency to a second frequency. In order to increase the efficient duty, a duty loss must be reduced, where the duty loss is inversely proportional to the switching period Ts, as shown in the mathematical formula 1. The switching period $T_s$ is inversely proportional to an operating frequency of transformer, such that it can be noted that the duty loss is proportional to the operating frequency of transformer. That is, the duty loss can be reduced by lowering the operating frequency of transformer from a first frequency to a second frequency which is lower than the first frequency. When the duty loss is decreased, an effective duty is increased, where an output voltage necessary for the load can be outputted with a much lower input voltage, and the output voltage necessary for the load may be outputted for much longer duration of time. That is, the hold-up time can be extended or prolonged by reducing the operating frequency of the voltage transformer unit.

The converter according to an exemplary embodiment of the present invention may be implemented as shown in FIG. 5. The converter may receive an input power (210) and may output the same to the load (220) through the voltage transformer unit (110) which converts the magnitude of voltage of inputted input power. The voltage transformer unit (110) may include an isolation transformer where the primary side and the secondary side of transformer may be electrically isolated.

The converter according to an exemplary embodiment of the present invention may be divided by an isolation line (30) to the primary side (10) and the secondary side (20). The primary side (10) may include an power factor improvement unit (150) connected to the input power (210) to improve the power factor by receiving an input voltage, a primary side of voltage transformer unit (110) and a link end (160) interposed between the power factor improvement unit (150) and the primary side of the voltage transformer unit (110). The secondary side (20) may include a secondary side of the voltage transformer unit (110), a control unit (120), and a switch driving unit (130) applying, to a gate of switch, a PWM (Pulse Width Modulation) signal driving the gate of switch of the voltage transformer unit (110) in response to a control signal of the control unit (120).

The control unit (120) may PWM-control the switch included in the voltage transformer unit in response to a first frequency or a second frequency based on the state of the input power. When an abnormality occurs on the input power, the control unit (120) may PWM-control the switch using the second frequency which is lower than the first frequency. As the operating frequency comes to be lower, the switching period of the switch may be increased. As the switching period is increased, the duty loss may be reduced to thereby extend the hold-up time.

The magnitude of signal outputted from the control unit (120) may be small for driving a switch, where the switch may be controlled by the magnitude adequate to drive the switch for the output signal of control unit (120) and an amplifying switch driving unit (130). The output may be made to the load (220) to be outputted through the voltage transformer unit (110).

The control unit (120) may detect the state of input power (210) through a voltage or current at an input end, or may be detected through the voltage at the link end of primary side of voltage transformer unit (110). The control unit (120) may detect the state of input power (210) through the voltage or current of input end to change a driving frequency of the voltage transformer unit (110) to a second frequency, or may detect the state of input power (210) through voltage of link end at a primary side of voltage transformer unit (110) to change the driving frequency of voltage transformer unit (110) to a second frequency.

The control unit (120) may control an operating frequency of secondary side of the voltage transformer unit (110) by changing the driving frequency of the voltage transformer unit (110) in changing the driving frequency. As shown in FIG. 5, when the converter is divided by the isolation to the primary side and the secondary side, the control unit (120) may control the operating frequency of secondary side of the voltage transformer unit to allow a quick operation through transmission of signal within the isolation line. It should be apparent that the control unit (120) can control the operating frequency at the primary side of the voltage transformer unit instead of secondary side.

The control unit (120) may be disposed at a secondary side of converter. The control unit (120) may be an MCU at a secondary side of converter. The converter may include an isolator (140) which insulates the primary side from the secondary side of converter, and the control unit (120) may receive a state of input power (210) through the isolator (140). The isolated primary side and the secondary side may transmit or receive the data through the isolator (140). The control unit (120) may receive the state of input power (210) including the voltage or current of input power through the isolator (140).

The second frequency may be a frequency so set as to allow an output voltage of the voltage transformer unit (110) to maintain a first value during a first time. Here, the first value may be a minimum voltage value required by the load, and the first time may be a time necessary for allowing a device connected to the load to be stably stopped of the operation, or a time necessary for performing an emergency operation during an emergent state. The first time may be changed in response to the load or emergent operation and may be set by a user.

As shown in FIG. 6, when an abnormality occurs on the input power (210), a power may be supplied to the load (220) through an auxiliary power (170) instead of input power (210). The auxiliary power (170) may output a load voltage to another output end (230) through an output line different from that of the voltage transformer unit (110). The control unit (120) may operate the voltage transformer unit (110) using a second frequency during a hold-up time which is a time for allowing the auxiliary power (160) to normally operate.

The control unit (120) may detect a state of voltage transformer unit (110) through a detection line (181). At this time, the control unit (120) may detect a temperature ($T_{sec}$) of voltage transformer unit, an output current ($L_{dc}$), and an output voltage ($V_{dc}$). The control unit (120) may transmit state information including a state of input power and a state of voltage transformer unit to a signal processor (240). Here, the signal processor (240) may be a main MCU.

The converter according to an exemplary embodiment of the present invention may include a control unit (121) at a primary side (abbreviated as 'primary control unit') which is disposed at a primary side (10) of converter to detect a state of input power (210), where the control unit (120) may be a control unit at a secondary side (abbreviated as 'secondary control unit') receiving a state of input power from the primary control unit. As shown in FIG. 7, the control unit (120, 121) may be respectively formed at a primary side (10) and a secondary side (20) of converter to detect or control the state of elements of primary side and secondary side whereby data may be mutually exchanged through an isolator (140). The primary control unit (121) may detect a state of input power (210) and may transmit the detected state of input power (210) to the secondary control unit (120). The primary control unit (121) may detect a power factor improvement unit (150), and may perform the PWM control by transmitting a signal for controlling a switch included in the power factor improvement unit (150) to a switch driving unit (131).

The second frequency may be a preset fixed frequency. The second frequency may be a fixed frequency applied when the input power (210) is developed with an abnormality, or may be one of frequencies preset in response to the capacity of load, and length of hold-up time to be maintained.

Alternatively, the second frequency may be a variable frequency. When the second frequency is a variable frequency, the control unit (120) may calculate the second frequency by using detected information. The second frequency may be variable in response to the magnitude of voltage at a link end at a primary side of transformer. The magnitude of voltage transmitted to the load through the voltage transformer unit (110) may be changed in response to the magnitude of voltage at the link end of primary side of voltage transformer unit, whereby the second frequency may be changed in response to the magnitude of voltage at the link end of primary side of voltage transformer unit. For example, as the magnitude of voltage at a link end of primary side of voltage transformer unit grows smaller, the degree of turning over to the secondary side may be maximized by further lowering the second frequency.

Alternatively, in a case where a voltage value of input power (210) is less than a threshold value instead of the input power (210) being cut off, the second frequency may be changed in response to magnitude of voltage of input power (210). When an input is being maintained even if the input power (210) is less than the threshold value, a voltage can be transmitted to the load (220) using the input power (210), whereby the second frequency can be changed in response to the voltage value of input power (210).

FIG. 8 is a graph showing a hold-up time when an operating frequency of a voltage transformer unit is not controlled and FIG. 9 is a graph showing a hold-up time when an operating frequency of a voltage transformer unit is controlled.

In FIG. 8 when an operating frequency of a voltage transformer unit is not controlled, a hold-up time (830) from a point (810) when a voltage ($V_{dc}$) of input power ($V_{dc}$) starts to drop to a last point (820) when an output voltage ($V_{out}$) maintains a first value is about 1000 us. On the contrary, In FIG. 9 when an operating frequency of a voltage transformer unit is controlled, a hold-up time (930) from a point (910) when a voltage ($V_{dc}$) of input power ($V_{dc}$) starts to drop to a last point (920) when an output voltage ($V_{out}$) maintains a first value is about 13,000 us, whereby it can be noted that the hold-up time (930) of FIG. 9 is substantially extended over that (830) of FIG. 8. As noted from the foregoing, the hold-up time can be improved by controlling an operating frequency of the voltage transformer unit in response to the state of input power.

FIG. 10 is a block diagram of a converter according to another exemplary embodiment of the present invention.

The converter according to another exemplary embodiment of the present invention may include a switch (1020), a sensor (1030) and a control unit (1040). To be more specific, the converter according to another exemplary embodiment of the present invention may include a sensor (1030) sensing a state of input power (1010) and a control unit (1040) controlling a switch (1020) of a full bridge converter, where the control unit (1040) may control the switch (1020) using a first frequency when the state of input power (1010) is in a normal state, and control the switch (1020) using a second frequency when the state of input power (1010) is in an abnormal state.

Now, redundant explanations corresponding to the detailed explanations on the converter in FIGS. 1 to 9 among the detailed explanations of a converter according to another exemplary embodiment of the present invention will be omitted.

The control unit (1040) may control the switch (1020) using other different frequencies through a first control and a second control in response to the state of input power (1010). Here, the abnormality may include a case where a voltage of input power (1010) is less than a predetermined value, or a case where input of the input power (1010) is cut off. At this time, the control unit (1040) may extend the hold-up time by controlling the switch (1020) using a second frequency. Here, the first frequency may be a frequency greater than a second frequency. That is, the control unit (1040) may extend the hold-up time by lowering a frequency.

FIG. 11 is a block diagram of a converter according to still another exemplary embodiment of the present invention.

The converter according to another exemplary embodiment of the present invention may include a first sensor (2020), a second sensor (2040), a switch (2050) and a control unit (1040). To be more specific, the converter may include a first sensor (2020) sensing a state of input power (2010), a second sensor sensing a state of load (2030), and a control unit (2060) controlling a switch (2050) of a full bridge converter, where the control unit (2060) may control the switch (2050) using a first frequency when the state of input power (2010) is a first state, control the switch (2050) using a second frequency when a state of input power (2010) is a second state and a state of load (2030) is a third state, and control the switch (2050) using a third frequency when a state of input power (2010) is a second state and a state of load (2030) is a fourth state. Now, a detailed explanation of converter according to another exemplary embodiment of the present invention corresponds to that of converter of FIGS. 1 to 9, or to that of converter of FIG. 10, such that redundant explanations thereto will be omitted.

The control unit (2060) may control the switch (2050) using mutually different frequencies for each state in response to the state of load (2030) and the input power (2010). The first state which is a state of input power (2010) may include a normal state and the second state may include a state where an abnormality has occurred. Alternatively, the state of input power (2010) may be a magnitude of a voltage applied from the input power (2010), the first state may include a state where the magnitude of voltage applied from the input power (2010) is the first voltage value, the second state may include a state where the magnitude of voltage applied from the input power (2010) is the second voltage value, where the first voltage value may be greater than the second voltage value. Here, the first voltage value or the second voltage value may be a value which is changed in response to the operation of converter, which is preset by a user, or which is a value set up by a user design.

The second state which is an abnormal state may include a case where the voltage of input power (2010) is less than a predetermined value, or a case where an input of input power (1010) is cut off. When the input power (2010) is in a first state, the control unit (2060) may control the switch (2050) using a first frequency.

When the input power (2010) is in a second state, the switch (2050) may be controlled by mutually different frequencies depending on the state of load (2030). The state of load (2030) may include a third state or a fourth state. Here, the third state may include a light load state, and the fourth state may include a load state having a greater value than that of the light load state. Alternatively, the state of load (2030) may be a magnitude of a current flowing in the load, the third state may include a state where a current flowing in the load (2030) is a first current value, the fourth state include a state where a current flowing in the load (2030) is a second current value, where the first current value may be smaller than the second current value. Here, the first current value or the second current value may be a value which differs in response to the operation of a converter, may be set up by a user, or may be a value set up by a user design.

When the input power (2010) is in a second state and the load (2030) is in a third state, the control unit (2060) may control the switch (2050) using a second frequency, and when the input power (2010) is in a second state and the load (2030) is in a fourth state, the control unit (2060) may control the switch (2050) using the third frequency.

When the input power (2010) is in a second state, the control unit (2060) may control the switch (2050) using a second frequency of second state, instead of a first frequency of first state to thereby extend the hold-up time. Here, the first frequency may be a frequency greater than that of the second frequency. That is, the control unit (1040) may lower the frequency to reduce the duty loss whereby the hold-up time can be extended even using a lower voltage. The duty loss is affected by the magnitude of load (2030) and therefore, the hold-up time can be adaptively extended in consideration the state of the load (2030). That is, when the input power (2010) is in a second state, the switch (2050) may be controlled using a frequency greater than that of the first frequency in a first state, when the state of load (2030) is in a third state, the switch is controlled using a second frequency, when the state of load (2030) is in a fourth state, the switch is controlled using a third frequency, whereby the hold-up time may be adaptively extended. Here, the second frequency may be a frequency greater than that of the third frequency. Even when the input power (2010) is in a first state, the control unit (2060) may change the frequency in response to the state of the load (2030). That is, when the input power (2010) is in a first state and the load (2030) is in a third state, the control unit (2060) may control the switch (2050) using a first frequency, and when the input power (2010) is in a first state and the load (2030) is in a fourth state, the control unit (2060) may control the switch (2050) using a fourth frequency. Here, the first frequency may be a frequency greater than that of the fourth frequency, and the fourth frequency may be a frequency greater than that of the second frequency or the third frequency.

The switch (2050) may be formed by including a complementary and conductive first upper switch constituting a full bridge, a second upper switch complementarily conductive with a first lower switch, and a second lower switch, and the control unit (1040) may change frequencies of the switch (2050). At this time, depending on the magnitude of current flowing in the load (2030), the time of the first upper switch and the second lower switch simultaneously maintaining an ON state, or the time of the first lower switch and the second upper switch simultaneously maintaining an ON state may be proportionally increased. For example, when the input power (2010) is in a second state and the load (2030) is in a third state, the time of the first upper switch and the second lower switch simultaneously maintaining an ON state or the first lower switch and the second upper switch simultaneously maintaining an ON state may be shorter than the time of first upper switch and the second lower switch simultaneously maintaining an ON state or the first lower switch and the second upper switch simultaneously maintaining an ON state when the input power (2010) is in a second state and the load (2030) is in a fourth state.

Here, the frequency of switch (2050) and the time of the first upper switch and the second lower switch simultaneously maintaining an ON state or the time of the first lower switch and the second upper switch simultaneously maintaining an ON state may be changed depending on the duty loss.

It should be understood by those skilled in the art that the present invention can be implemented in other detailed shapes without changes of technical ideas or essential characteristics. Thus, it should be understood that the disclosed methods must be considered not in a limited aspect but in an explanatory aspect. It should be also interpreted that the scope of the present invention is not shown in the aforementioned explanation but in the claims, and all differences within the equivalents thereof shall be included in the present invention.

The invention claimed is:

1. A converter comprising:
   a voltage transformer unit configured to convert an input voltage of input power to a predetermined voltage and output same; and
   a control unit configured to:
   control an operating frequency of the voltage transformer unit as a first frequency when a state of the input power is a first state,
   control the operating frequency of the voltage transformer unit as a second frequency when the state of the input power is a second state and the state of a load is a third state, and
   control the operating frequency of the voltage transformer unit as a third frequency when the state of the input power is the second state and the state of the load is a fourth state,
   wherein the third state comprises a light load state, and the fourth state comprises a load state having a value greater than that of the light load state.

2. The converter of claim 1, wherein the first state comprises a normal state, and the second state comprises a state where an abnormality has developed on the input power.

3. The converter of claim 1, wherein the first frequency is greater than the second frequency.

4. The converter of claim 1, wherein the second frequency is set to allow an output voltage of the voltage transformer unit to maintain a first value for a first time duration.

5. The converter of claim 1, wherein the second state comprises the voltage of the input power being less than a predetermined value or when an input of the input power is cut off.

6. The converter of claim 1, wherein the second frequency is changed in response to a magnitude of a voltage at a link end of a primary side of the voltage transformer unit.

7. The converter of claim 1, wherein the second frequency is changed in response to a magnitude of a voltage of the input power.

8. The converter of claim 1, wherein the control unit controls a switch included in the voltage transformer unit in response to the second frequency.

9. The converter of claim 1, wherein the control unit controls an operating frequency at a secondary side of the voltage transformer unit.

10. The converter of claim 1, wherein the control unit is disposed at a secondary side of the converter.

11. The converter of claim 1, wherein the converter comprises an isolator which insulates a primary side and a secondary side of the converter, and wherein the control unit receives the state of the input power through the isolator.

12. The converter of claim 1, wherein the converter comprises a primary side control unit disposed at a primary side of the converter to detect the state of the input power, and
   wherein the control unit is a secondary side control unit which receives the state of the input power from the primary side control unit.

13. The converter of claim 1, wherein the voltage transformer unit comprises:
   a plurality of switches forming a full bridge and configured to perform a phase shift operation; and
   a transformer configured to change voltages in response to the operations of the plurality of switches and insulated at a primary side and a secondary side.

14. A converter comprising:
   a sensor configured to sense a state of an input power; and
   a control unit configured to control switches of a full bridge converter,
   wherein the control unit:
   controls the switches using a first frequency when the state of the input power is normal, controls the switches using a second frequency when the state of the input power is abnormal and the state of a load is a light load state, and controls the switches using a third frequency when the state of the input power is the abnormal and the state of the load is a load state having a value greater than that of the light load state.

15. The converter of claim 14, wherein the first frequency is greater than the second frequency.

16. The converter of claim 14, wherein the control unit controls the switches using the second frequency in case where the voltage of the input power is less than a predetermined value or when an input of the input power is cut off.

17. The converter of claim 14, wherein the second frequency is changed in response to magnitude of voltage of the input power.

18. A converter comprising:

a first sensor configured to sense a state of an input power;

a second sensor configured to sense a state of a load; and a control unit configured to control switches of a full bridge converter, wherein the control unit controls the switches using a first frequency when the state of the input power is a first state, controls the switches using a second frequency when the state of the input power is a second state and the state of the load is a third state, and controls the switches using a third frequency when the state of the input power is the second state and the state of the load is a fourth state, and wherein the third state comprises a light load state, and the fourth state comprises a load state having a value greater than that of the light load state.

19. The converter of claim 18, wherein the first state comprises a normal state, the second state comprises a state where the input power is generated with abnormality.

20. The converter of claim 18, wherein the first frequency is greater than the second frequency, and the second frequency is greater than the third frequency.

\* \* \* \* \*